United States Patent Office 3,836,515
Patented Sept. 17, 1974

3,836,515
PROCESS FOR PREPARING SOLID TELOMERS AND COTELOMERS
Emil Trebillon, Neuilly-sur-Seine, and Georges Wetroff, Le Thillay, France, assignors to Rhone-Progil, Paris, France
No Drawing. Filed Mar. 23, 1972, Ser. No. 237,559
Claims priority, application France, Mar. 31, 1971, 7111327
Int. Cl. C08f 1/66
U.S. Cl. 260—87.5 R                5 Claims

ABSTRACT OF THE DISCLOSURE

The preparation of solid telomers and cotelomers by heating a mixture of vinyl chloride or comonomers containing at least 30% by weight vinyl chloride, and at least one halogenated organic derivative having a mobile halogen, in the presence of a catalyst selected from the group consisting of magnesium, barium, chromium, nickel, zinc, mercury, silicon, tin and lead, and a polar solvent which is at least partially miscible with the halogenated organic derivative/monomer mixture.

---

This invention relates to a process for preparing solid telomers and cotelomers.

In copending application Ser. No. 211,061, filed Dec. 22, 1971, description is made of a process for the preparation of telomers and cotelomers in which use is made of iron or copper as the catalyst and the products obtained are low molecular weight liquids of various viscosities.

It is an object of this invention to provide a method for the preparation of telomers and cotelomers which have high molecular weights and which are solid at ambient temperature.

In accordance with the practice of the present invention, a process for preparing solid telomers and cotelomers comprises heating a mixture of vinyl chloride or comonomers containing at least 30% vinyl chloride, and at least one halogenated organic derivative having a mobile halogen, in the presence of a catalyst selected from magnesium, barium, chromium, nickel, zinc, mercury, silicon, tin and lead and a polar solvent which is at least partially miscible with the halogenated organic derivative/monomer mixture.

Preferably, the halogenated organic derivatives are selected from the chlorinated, brominated, chlorobrominated, chlorofluorinated, bromofluorinated, and chlorobromofluorinated derivatives of methane and ethane, isobutyl bromide, dichloroacetic acid and trichloroacetic acid esters, benzyl chloride and the chlorides of aromatic sulphonic acids.

The halogenated organic derivatives constitute telogens, that is, compounds which supply the ends of the telomer or cotelomer chain.

The preferred polar solvents are alcohols, especially isopropanol, and acetonitrile. As will be seen from the examples hereafter given, the substitution of a hydrocarbon for the polar solvent reduces the yield of the present process to a very considerable extent, even to zero, depending somewhat upon the monomers used. The same is true if there is no solvent in the reaction mixture. The presence of water in the reaction mixture is also to be avoided since, event when water is present in only a small proportion, the yield of the process is markedly reduced.

Monomers having an ethylenic double bond, other than vinyl chloride, can be used conjointly with vinyl chloride in this process. It is thus possible to use a wide variety of monomer mixtures, the yield varying depending upon the reactivity of the monomers of the mixture.

Maleates, for example, give low yields, whereas vinyl chloride alone or a styrene-vinyl chloride mixture telomerizes with yields close to 100%. In any event, at least 30% of the monomer mixture used must be vinyl chloride.

Advantageously, the molar ratio of monomer to halogenated organic derivative should be within the range of 0.5 to 300.

In contrast to observations of the process of the previously mentioned copending application, an increase in the ratio of monomer to halogenated organic derivative does not have an appreciable influence on the degree of telomerization.

Desirably, the molar ratio of monomer to catalyst is within the range of 20 to 2000 and preferably from 75 to 1000. The catalyst should have a large surface area; turnings, powder, granules, wires or bars are very suitable forms for the catalyst.

Preferably, the molar ratio of monomer to solvent is within the range of 2 to 20.

When carrying out the process, according to the invention, the constituents of the reaction mixture may be introduced into an autoclave in any order, taking care, however, to avoid deposition of the catalyst, if it is in powder form, on the bottom or a wall of the autoclave. Such deposition can be prevented by introducing the catalyst in a liquid phase with agitation. In the case of an especially reactive monomer, the latter will preferably be introduced progressively after the other constituents.

The pressure to be maintained within the autoclave depends upon the monomers and the solvent being used and is usually within the range of 1 and 30 bars.

The reaction temperature depends upon the reactivity and volatility of the monomers being used but is within the range of 60° to 200° C.

The autoclave in which the reaction takes place is preferably internally lined with an anti-pollution material, such as a vitreous material, tantalum or silver, and is provided with an agitator which is sufficiently effective to mix the whole of the reaction mixture uniformly to distribute the (solid) catalyst in the whole of the liquid phase.

The telomers and cotelomers obtained by the present process possess properties which make them particularly suitable for the preparation of a variety of coatings for metal or other surfaces requiring protection, for example coatings in the form of paints or varnishes. They are easier to dissolve than conventional polymers and the solutions obtained are completely limpid. A mixture of methylethylketone and toluene or xylene makes a particularly suitable solvent. The thermal stability of these telomers and cotelomers is also notable.

The following examples are given by way of illustration, but not by way of limitation, of the process of this invention. The examples embody comparison to illustrate the possibilities of the process and the conditions to be observed in the performance thereof.

EXAMPLE 1

A steel autoclave, having a vitreous lining, was used as the reaction vessel. The autoclave was provided with an agitator and an outer casing to define a heat exchange chamber therebetween communicating with a thermostatically controlled liquid circuit. Into the autoclave, succesive introductions were made, with agitation, of 190 g. isopropanol, 2.93 g. nickel having a grain size within the range of 0.05 to 0.03 mm. diameter, 385 g. carbon tetrachloride, and 781 g. vinyl chloride. The temperature was raised progressively to 88–90° C. by circulating oil at an appropriate temperature through the heat exchange chamber. That a reaction was occurring in the autoclave was indicated by a tendency first for the temperature to rise, although it was maintained at 90° C. by the heat exchange oil, and then to drop in pressure due to telom-"

erization. The pressure, after reaching a maximum of 12.3 bars, subsequently dropped to 5 bars after 10 hours.

After cooling and expansion of the residual gases in the autoclave to atmospheric pressure, a thick suspension was left. The suspension was filtered and three-fold washing of the residual solid was carried out using an equal volume of carbon tetrachloride at 50° C., followed by washing in succession with a 3% by weight aqueous solution of hydrochloric acid, deionized water, and a 3% by weight aqueous solution of bicarbonate of soda, and then it was finally washed with de-ionized water until the wash water was neutral.

After drying in air, 697 g. of a slightly greyish-white solid containing 58.2% of chlorine was obtained. The viscosity index of a 0.5% by weight solution of the solid in cyclohexanone was 12. Examination by N.M.R. (Nuclear Magnetic Resonance) confirmed that the product was a long chain telomer of the vinyl chloride type of the general formula $$CCl_3-(CH_2-CHCl)_n-CH_2-CHCl_2$$

A similar experiment carried out without the presence of nickel produced no reaction.

Other comparable experiments carried out without isopropanol present or in the presence of a hydrocarbon instead of isopropanol did not produce any telomer even when the reaction temperature was raised to 110° C.

EXAMPLE 4

This example illustrates the effectiveness of other catalysts which are not always as obviously effective as those metals of Examples 1, 2 and 3 but which nevertheless are appreciably active. The experiments were carried out as described in Examples 1, 2 and 3, using 781 g. of vinyl chloride, 385 g. of carbon tetrachloride and 190 g. of isopropanol, at a temperature of 90° C. The operating conditions and the results obtained are listed in Table 1. The viscosity index was measured as in the foregoing examples.

TABLE I

| Catalyst element | | | Reaction conditions | | Product obtained | | | |
|---|---|---|---|---|---|---|---|---|
| Nature | Weight (g.) | Granulometry (mm.) or physical state | Pressure (bars) | Duration (hours) | Weight (g.) | Percent Cl (by wt.) | Viscosity index | Appearance |
| Tin | 10 | 0.2–1 (powder) | 13–12.2 | 14 | 97 | 57.6 | 17 | Greyish-white powder. |
| Mercury | 15.5 | Liquid | 13–11.9 | 19 | 195 | 57.9 | 15 | Do. |
| Lead | 16 | 0.3–1 (powder) | 13–12.9 | 18 | 28 | | | |
| Aluminium | 2.1 | 0.1–5 (lamellae) | 13–12.9 | 17 | 34 | 57.8 | | |

Positive results were also obtained using silicon, chromium or barium under operating conditions similar to those just described.

EXAMPLE 5

This example illustrates the influence of the monomer/telogen halogenated organic derivative ratio. The influence was found to be very slight. The reactions were carried out in the presence of magnesium (2 g.) in the form of lamellae of 0.1–0.5 mm. maximum dimension, using 781 g. of vinyl chloride, 190 g. of isopropanol and carbon tetrachloride, as telogen, in various quantities. The reaction temperature was 91° C. and the duration of reaction was 15 hours. The separation and washing processes were as described in Example 1. The quantities of telogen used, the pressures observed during the reactions and the characteristics of the products obtained are given in Table II.

TABLE II

| Telogen | | | Product obtained | | |
|---|---|---|---|---|---|
| Weight | Molar ratio, $CH_2=CHCl/CCl_4$ | Pressure (bars) | Weight, g. | Viscosity index | Appearance |
| 385 | 5 | 13.9–13.0 | 56 | 23 | Very white powder. |
| 193 | 10 | 14.5–14.2 | 47 | 21 | Do. |
| 129 | 15 | 14.9–14.6 | 36 | 21 | Do. |
| 64.5 | 30 | 15.3–15.1 | 37 | 24 | Do. |
| 32.2 | 60 | 16.0–15.8 | 40 | 23 | Do. |
| 16 | 120 | 16.0–15.8 | 38 | 23 | Do. |

EXAMPLE 2

The experiment was carried out as described in Example 1 but with nickel replaced by 5 g. of zinc of grain size ranging from 0.1 to 0.5 mm.

The reaction commenced at 89° C. The pressure was then at a maximum, 12.4 bars. After the reaction mixture had been maintained for 8 hours at 90° C., the pressure had dropped to 9.9 bars. The autoclave was left to cool and the process was then continued as described in Example 1.

485 g. of solid greyish-white telomer, containing 57.5% of chlorine, was obtained. The viscosity index of a 0.5% by weight solution of this product in cyclohexanone was 17. The structure revealed by N.M.R. was comparable with that of Example 1.

EXAMPLE 3

An experiment similar to that of Examples 1 and 2 was carried out, using as catalyst, 2 g. of magnesium in the form of lamellae having maximum dimensions ranging from 0.1 to 5 mm. obtained by crushing turnings. After 15 hours at 90° C., under a pressure decreasing from 13.9 to 13 bars, and after the same separation and washing process as described in Example 1, a yield of 56 g. of very white powder containing 57.1% of chlorine was obtained. The product had a viscosity, measured as in Examples 1 and 2, of 23. The mean molecular weight obtained by gel permeation chromatography was 16,000.

EXAMPLE 6

This example illustrates the preparation of telomers by the process of the invention using a telogen other than carbon tetrachloride.

The experiment was carried out under the same operating conditions and with the same reaction mixture as those of the preceding example but with the substitution of 253 g. of benzyl chloride for the carbon tetrachloride.

67 g. of telomer in the form of a brown powder containing 53.5% of chlorine was obtained.

EXAMPLE 7

This and the following example illustrate the preparation of cotelomers by the process of this invention.

Into the reaction vessel of Example 1 there were introduced 437 g. of vinyl chloride, 231 g. of carbon tetrachloride, 210 g. of propylene, 120 g. of isopropanol and then, with agitation, 3 g. of zinc in the form of a powder constituted of grains of sizes ranging from 0.03 to 0.1 mm. The pressure, at 90° C., reached 23 bars and then dropped to 21 bars after 18 hours at the same temperature.

The same separation and washing process, as described in Example 1, gave 225 g. of cotelomer in the form of a white powder containing 53.3% of chlorine and having a viscosity index, measured as a 0.5% by weight solution in cyclohexanone, of 15.

EXAMPLE 8

Into the reaction vessel of Example 1, there were introduced 781 g. of vinyl chloride, 385 g. of carbon tetrachloride, 120 g. of isopropanol, 100 g. of ethyl acrylate and, with agitation, 2.93 g. of nickel as a powder similar to that used in Example 1. During 8 hours of heating at 90° C., the pressure decreased from the initial pressure of 14 bars. After separation and washing, 420 g. of cotelomer was obtained as a greyish-white powder containing 47% of chlorine and having a viscosity index, measured as in Example 7, of 15.

EXAMPLE 9

This example illustrates the influence of the proportion of the polar solvent present in the reaction mixture.

A first experiment was carried out under the same conditions as those described in the foregoing examples but the quantity of carbon tetrachloride (telogen) was 157 g. and that of isopropanol was 19 g. The catalyst was magnesium (2 g.). No precipitation at all of telomer was observed in the reaction mixture.

In a second experiment, using ten times the quantity of isopropanol enabled 38 g. of solid telomer containing 57.5% by weight of chlorine to be obtained, having a viscosity index, measured as previously described, of 19.

EXAMPLE 10

An autoclave identical to that described in Example 1 was used in this example. A bar of magnesium having a diameter of 10 mm. and a length of 190 mm. was fixed within the autoclave to extend vertically perpendicularly to the cover. The bar of magnesium of industrial quality, having a purity of 97–98%, constituted the catalyst.

Into the autoclave successive introductions were made of 190 g. secondary butyl alcohol, 385 g. carbon tetrachloride and 774 g. vinyl chloride.

The mixture was agitated at 95° C. for 20 hours at a pressure within the range of 14 and 12 bars. After cooling and expansion of the residual gases, a thick suspension was obtained which was filtered. The resulting solid material was washed twice with methanol and dried in air. 560 g. of a solid telomer, in the form of a white powder, was obtained, the mean molecular weight of which (measured with a vapor pressure osmometer on a solution of the telomer in tetrahydrofuran) was 8,700".

It will be understood that changes may be made in the details of formulation and operation without departing from the spirit of the invention, especially as defined in the following claims.

We claim:

1. A process for preparing solid telomers and cotelomers consisting essentially of the steps of heating a mixture of vinyl chloride or comonomers containing at least 30% by weight vinyl chloride, and at least one halogenated organic derivative having a mobile halogen selected from the group consisting of chlorinated, brominated, chlorobrominated, chlorofluorinated, bromofluorinated and chlorobromofluorinated methane and ethane, isobutyl bromide, dichloroacetic acid and trichloroacetic acid esters, benzyl chloride and the chlorides of the aromatic sulphonated acids and present in the molar ratio of monomer to halogenated organic derivative in the range of 0.5 to 300, in the presence of a catalyst selected from the group consisting of magnesium, barium, chromium, nickel, zinc, mercury, silicon, tin and lead, in which the molar ratio of monomer to catalyst is within the range of 20 to 2000, and a polar solvent at least partially miscible with the halogenated organic derivative/monomer mixture in which the molar ratio of monomer to solvent is within the range of 2 to 20.

2. A process as claimed in Claim 1 in which the molar ratio used of monomer to catalyst is within the range of 75 to 1000.

3. A process as claimed in Claim 1 in which the polar solvent is selected from the group consisting of alcohols and acetonitrile.

4. A process as claimed in Claim 3 in which the polar solvent is isopropanol.

5. A process as claimed in Claim 3 in which the polar solvent is secondary butyl alcohol.

References Cited

UNITED STATES PATENTS

| | | | |
|---|---|---|---|
| 2,011,132 | 8/1935 | Young et al. | 260—2 |
| 2,440,800 | 5/1948 | Hanford et al. | 260—65.8 |
| 2,647,107 | 7/1953 | Barnes | 260—78.5 |
| 2,831,843 | 4/1958 | Seymour | 260—92.8 |
| 2,831,844 | 4/1958 | Seymour et al. | 260—92.8 |

STANFORD M. LEVIN, Primary Examiner

U.S. Cl. X.R.

260—32.8 R, 78.5 R, 86.3, 87.5 C, 92.8 R; 117—132 R